(12) United States Patent
Pekala et al.

(10) Patent No.: US 6,586,138 B2
(45) Date of Patent: Jul. 1, 2003

(54) FREESTANDING MICROPOROUS SEPARATOR INCLUDING A GEL-FORMING POLYMER

(75) Inventors: Richard W. Pekala, Corvallis, OR (US); Mehrgan Khavari, Corvallis, OR (US)

(73) Assignee: Amtek Research International LLC, Lebanon, OR (US)

( * ) Notice: Subject to any disclaimer, the term of this patent is extended or adjusted under 35 U.S.C. 154(b) by 118 days.

(21) Appl. No.: 09/777,367

(22) Filed: Feb. 5, 2001

(65) Prior Publication Data

US 2002/0001753 A1 Jan. 3, 2002

Related U.S. Application Data

(60) Provisional application No. 60/232,184, filed on Sep. 12, 2000, provisional application No. 60/186,732, filed on Mar. 3, 2000, and provisional application No. 60/180,419, filed on Feb. 4, 2000.

(51) Int. Cl.$^7$ .................................................. H01M 2/16
(52) U.S. Cl. .................... 429/249; 429/247; 429/248; 429/250
(58) Field of Search ................................. 429/249, 248, 429/250, 247

(56) References Cited

U.S. PATENT DOCUMENTS 3,989,540 A  11/1976  Feuillade et al. .......... 29/623.1

(List continued on next page.)

FOREIGN PATENT DOCUMENTS

| EP | 0476198 A1 | 9/1990 | ........... B01D/71/26 |
| EP | 0651455 A1 | 10/1994 | .......... H01M/10/40 |
| EP | 0651455 A1 * | 5/1995 | .......... H01M/10/40 |
| EP | 0933824 A2 | 1/1999 | ............ H01M/2/16 |
| JP | 513105 | 1/1993 | .......... H01M/10/40 |
| JP | 896788 | 4/1996 | ............ H01M/2/16 |
| JP | 10144571 | 5/1998 | ............ H01G/9/00 |
| JP | 10189054 | 7/1998 | .......... H01M/10/40 |
| JP | 10-275633 | 10/1998 | .......... H01M/10/40 |
| JP | 080176 | 3/2000 | .............. C08J/5/18 |

OTHER PUBLICATIONS

Tsuchida, A Mechanism of Ionic Conduction of Poly (Vinylidene Flouride)—Lithium Perchlorate Hybrid Films, *Electrochimica Acta*, v.28, No. 6, pp. 833–837 (1983).

*Primary Examiner*—Patrick Ryan
*Assistant Examiner*—Angela J Martin
(74) *Attorney, Agent, or Firm*—Stoel Rives LLP

(57) ABSTRACT

A freestanding battery separator includes a microporous polymer web with passageways that provide overall fluid permeability. The polymer web preferably contains UHM-WPE and a gel-forming polymer material. The structure of or the pattern formed by the gel-forming polymer material and wettability of the UHMWPE polymer web result in a reduction of the time required to achieve uniform electrolyte distribution throughout the lithium-ion battery. In a first embodiment, the gel-forming polymer material is a coating on the UHMWPE web surface. In a second embodiment, the gel-forming polymer material is incorporated into the UHM-WPE web while retaining overall fluid permeability. Both embodiments produce hybrid gel electrolyte systems in which gel and liquid electrolyte co-exist.

18 Claims, 7 Drawing Sheets

U.S. PATENT DOCUMENTS

| | | | |
|---|---|---|---|
| 4,539,256 A | 9/1985 | Shipman | 428/315.5 |
| 5,173,235 A | 12/1992 | Kamei et al. | |
| 5,296,318 A | 3/1994 | Gozdz et al. | 429/192 |
| 5,429,891 A * | 7/1995 | Gozdz et al. | 429/192 |
| 5,571,634 A | 11/1996 | Gozdz et al. | 429/192 |
| 5,607,185 A | 3/1997 | Isaji et al. | 280/806 |
| 5,639,573 A | 6/1997 | Oliver et al. | |
| 5,681,357 A * | 10/1997 | Eschbach et al. | 29/623.5 |
| 5,759,720 A | 6/1998 | Amatucci | 429/224 |
| 5,853,916 A | 12/1998 | Venugopal et al. | 429/190 |
| 5,900,183 A | 5/1999 | Kronfli et al. | 252/62.2 |
| 5,922,493 A | 7/1999 | Humphrey, Jr. et al. | 429/316 |
| 5,962,168 A | 10/1999 | Denton, III | 429/303 |
| 5,998,559 A | 12/1999 | Narang et al. | 528/14 |
| 6,024,773 A | 2/2000 | Inuzuka et al. | 29/623.4 |
| 6,027,836 A | 2/2000 | Okada et al. | 429/314 |
| 6,143,216 A | 11/2000 | Loch et al. | 264/45.1 |
| 6,245,272 B1 * | 6/2001 | Takita et al. | 264/210.4 |
| 6,299,653 B1 * | 10/2001 | Hoshi et al. | 29/623.1 |

* cited by examiner

FREESTANDING MICROPOROUS SEPARATOR INCLUDING A GEL-FORMING POLYMER

RELATED APPLICATIONS

This application derives priority from U.S. provisional patent application Nos. 60/232,184, 60/186,732, and 60/180,419, filed Sep. 12, 2000, Mar. 3, 2000, and Feb. 4, 2000, respectively.

TECHNICAL FIELD

This invention relates to the field of separators for electrochemical cells and more particularly to microporous polyolefin separators for such cells.

BACKGROUND OF THE INVENTION

Lithium-ion batteries are the preferred power source for most portable electronics devices. This is so because lithium-ion batteries exhibit higher energy density, longer cycle life, and higher operational voltage as compared to nickel cadmium, nickel metal hydride, and other rechargeable battery systems. Lithium-ion batteries also provide advantages when compared to lithium primary batteries in that they generally use a carbon-based anode as opposed to highly reactive metallic lithium. The carbon-based anode functions via the intercalation of lithium ions between graphene sheets. Lithium-ion batteries are typically produced in spiral wound and prismatic configurations in which a separator is sandwiched between anode and cathode ribbons. The pores of the separator are then filled with an ionically conductive electrolyte. Lithium-ion polymer batteries are produced using electrode ribbons of similar type with a gel electrolyte sandwiched between them.

Thus battery separators are an integral part of the operation, performance, and safety of lithium-ion batteries. The principal function of the separator is to prevent electrical conduction (i.e., "shorts") between the anode and the cathode while permitting ionic conduction via the electrolyte. In addition to providing good mechanical properties for winding and low electrical resistivity for device performance, separators play an important role in the overall safety of lithium-ion cells. During a thermal excursion above about 120° C., a liquid electrolyte-filled separator is expected to "shutdown" so that ionic conduction between the anode and cathode is eliminated. Separator composition is the variable that largely determines the shutdown temperature.

In general, polypropylene separators have a shutdown temperature that is too high (>150° C.) for use in lithium-ion applications, while high density polyethylene (HDPE) separators often do not fully shutdown because of "hole formation" that results from shrinkage and poor mechanical integrity under pressure and high temperature. Ultrahigh molecular weight polyethylene (UHMWPE) separators are usually transformed into a nonporous, clear film upon shutdown. Another advantage of UHMWPE separators is that they can be modified with linear low density polyethylene (LLDPE) or other forms of polyethylene to manipulate the shutdown temperature without compromising mechanical integrity. Therefore, UHMWPE separators offer desirable safety features for use in liquid electrolyte lithium-ion batteries.

Polyolefin separators are generally prepared using either a "dry" or "wet" method of manufacture, and which of these methods is employed has a profound effect on the porosity, pore size distribution, and tortuosity of the separator. Separators manufactured using the "dry" method generally have a distinct slit-pore microstructure with a pore width of approximately 40 nm. Separators manufactured using the "wet" process have interconnected spherical and/or elliptical pores with diameters of 50–100 nm. UHMWPE separators have outstanding mechanical properties and exhibit excellent wettability with organic electrolytes.

One physical property of battery separators that is of special concern to battery manufacturers is separator thickness because there exists a need for improved energy and power density in lithium-ion batteries. These concerns have caused battery manufacturers to consider thinner separators. Most separators have thicknesses of 20–50 micrometers, but advances in lithium-ion battery technology have made it desirable for separator manufacturers to provide separators as thin as 8 micrometers. Separator thickness is largely dependent on the manufacturing process employed.

There are two types of electrolyte system commonly used in lithium-ion batteries. The first type of commonly used electrolyte system is a liquid electrolyte system in which a liquid electrolyte is used to provide sufficient ionic conduction between electrodes that are packaged in a cylindrical or prismatic metal can. Liquid electrolyte systems have the advantage of providing a thin electrolyte-filled separator with excellent conductivity. However, the use of a liquid electrolyte system necessitates the use of a metal can to contain the liquid electrolyte system. The use of metal cans limits a battery manufacturer's options in terms of battery shape and size.

The second type of commonly used electrolyte system is a gel electrolyte system in which a gel electrolyte is sandwiched between the electrodes. One method of creating a gel-electrolyte system entails heating a mixture of liquid electrolyte and semi-crystalline polymer(s). Cooling the liquid electrolyte/polymer mixture forms a gel. A major advantage of this approach is that the electrolyte has been immobilized, much like water is immobilized in the gelatin polymer used to produce the Jell-O™ gelatin. The gel electrolyte system also enables battery manufacturers to bond the electrodes together and utilize a flexible pouch rather than a metal can to package the battery, resulting in increased form factor options (i.e., battery shape and size). However, a major disadvantage of the gel electrolyte system is its increased thickness (approximately two to three times thicker than the liquid electrolyte system), which leads to reduced energy and power density. Also, the gel electrolyte system suffers from (1) poor mechanical properties, making assembly difficult and increasing the incidence of shorting between the electrodes, (2) a tendency to swell at elevated temperatures, and (3) lower conductivity as a compared to liquid electrolyte systems.

It is thus desirable to create an electrolyte system that maximizes the advantages of both the liquid and gel electrolyte systems while minimizing their disadvantages. One prior art attempt to achieve this objective entailed coating a porous separator with a nonporous gel-forming polymer and then sandwiching the resulting separator between two electrodes. The electrode and separator combination was then placed in a flexible pouch and liquid electrolyte was introduced. The liquid electrolyte wicked into the electrodes and then into the edges of the polymer web, and the electrolyte then diffused throughout the polymer web and the polymer web coating. The flexible pouch was heated under pressure to bond the electrodes together and to form a homogeneous gel electrolyte system.

In a second prior art attempt, a slurry of gel-forming polymer and liquid electrolyte was coated onto a polyolefin web. Thereafter, the paste was heated such that the gel-forming polymer seeped or was drawn into the pores of the polyolefin web. Upon cooling, the gel-forming polymer became a rigid gel electrolyte. Thus the pores in the bulk region of the resultant separator were completely filled with gel electrolyte.

The gel electrolyte systems resulting from these two prior art attempts exhibit sufficient ionic conductivity, flexibility, and thickness to allow the user to implement new battery shapes. However, both procedures suffer from increased manufacturing cycle time and a consequent inefficient manufacturing process as a result of the dramatic increase in time required to achieve uniform electrolyte distribution.

Accordingly, there exists a need for use as a lithium-ion battery separator a microporous, thin, open-cell structure that maximizes electrolyte wetting and filling and exhibits high ionic conductivity.

SUMMARY OF THE INVENTION

An object of the present invention is to provide a microporous polymer web for use in lithium-ion batteries that contains passageways which foster expedient and uniform electrolyte distribution, thereby resulting in reduced cycle time and resistivity and increased wettability.

The present invention is a freestanding battery separator comprising a microporous polymer web with passageways that provide overall fluid permeability. The polymer web preferably contains UHMWPE and a gel-forming polymer material. The structure of or the pattern formed by the gel-forming polymer material and wettability of the UHMWPE polymer web result in a reduction of the time required to achieve uniform electrolyte distribution throughout the lithium-ion battery.

In a first embodiment, the gel-forming polymer material is a microporous coating on the UHMWPE web surface. Using a microporous coating facilitates expedited uniform distribution of electrolyte and thereby reduces manufacturing cycle time of the battery. Additionally, the microporous coating allows the separator to be bonded to the electrodes and allows the formation of a hybrid electrolyte system in which both gel and liquid electrolyte co-exist. This hybrid electrolyte system results in a thin (less than 50 micrometers) separator with good flexibility and higher ionic conduction than a single-phase gel electrolyte system.

In a second embodiment, the gel-forming polymer material is incorporated into the UHMWPE web during an extrusion process. During a subsequent extraction process, passageways that provide overall fluid permeability are formed throughout the web. More specifically, the gel-forming polymer material is added to an extruder with UHMWPE and a plasticizer. The mixture is processed at an elevated temperature to yield a thin film. Subsequent removal of the plasticizer by an extraction process results in a microporous freestanding unitary structure in which regions of gel-forming polymer are dispersed throughout the microporous structure.

Additional objects and advantages of this invention will be apparent from the following detailed description of preferred embodiments thereof, which proceeds with reference to the accompanying drawings.

DETAILED DESCRIPTION OF THE PREFERRED EMBODIMENTS

Different embodiments of the present invention entail the addition of a gel-forming polymer material to a microporous polymer web to form a freestanding unitary structure that contains passageways which provide overall fluid permeability for the unitary structure. The freestanding unitary structure is preferably used as a separator in lithium-ion batteries, but has other uses, e.g., a filtration membrane. Additionally, the microporous nature of the gel-forming polymer material fosters the creation of a hybrid electrolyte system in which both gel electrolyte and liquid electrolyte co-exist. This hybrid electrolyte system produces a highly flexible, thin battery separator with excellent electrical conductivity.

Figure 1:
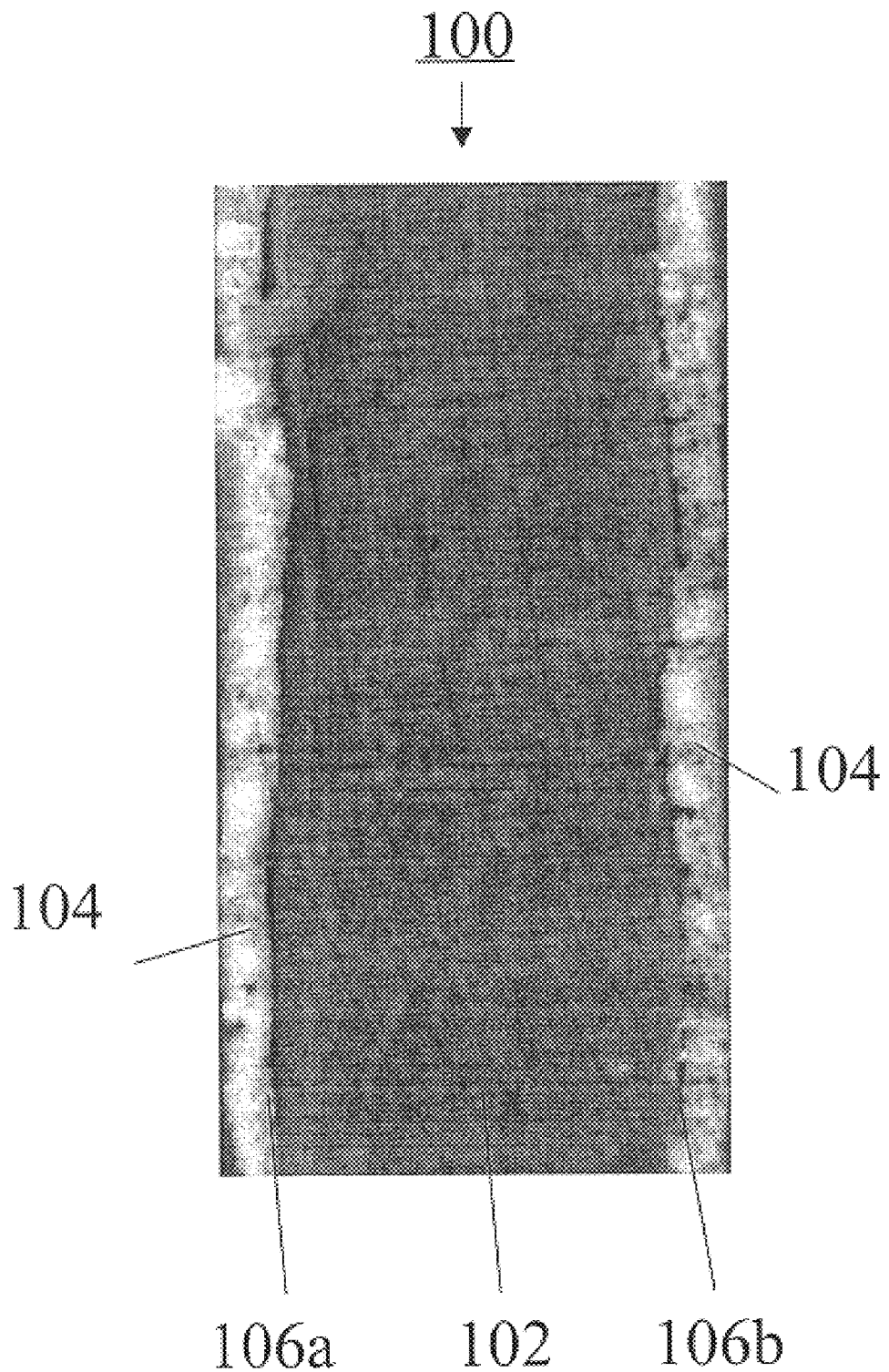
FIG. 1 is a scanning electron micrograph showing a cross-sectional view of a battery separator containing a UHMWPE web coated with microporous gel-forming polymer layers (PVDF).

In a first preferred embodiment of the present invention, the gel-forming polymer material is in the form of a layer coating a microporous polymer web surface. Preferably the gel-forming polymer material is PVDF, and the microporous polymer web is composed of UHMWPE. FIG. 1 is a scanning electron micrograph showing a cross-sectional view of a microporous battery separator 100 containing a UHMWPE web 102 whose first major surface 106a and second major surface 106b are each coated with a microporous PVDF layer 104.

Figure 2:
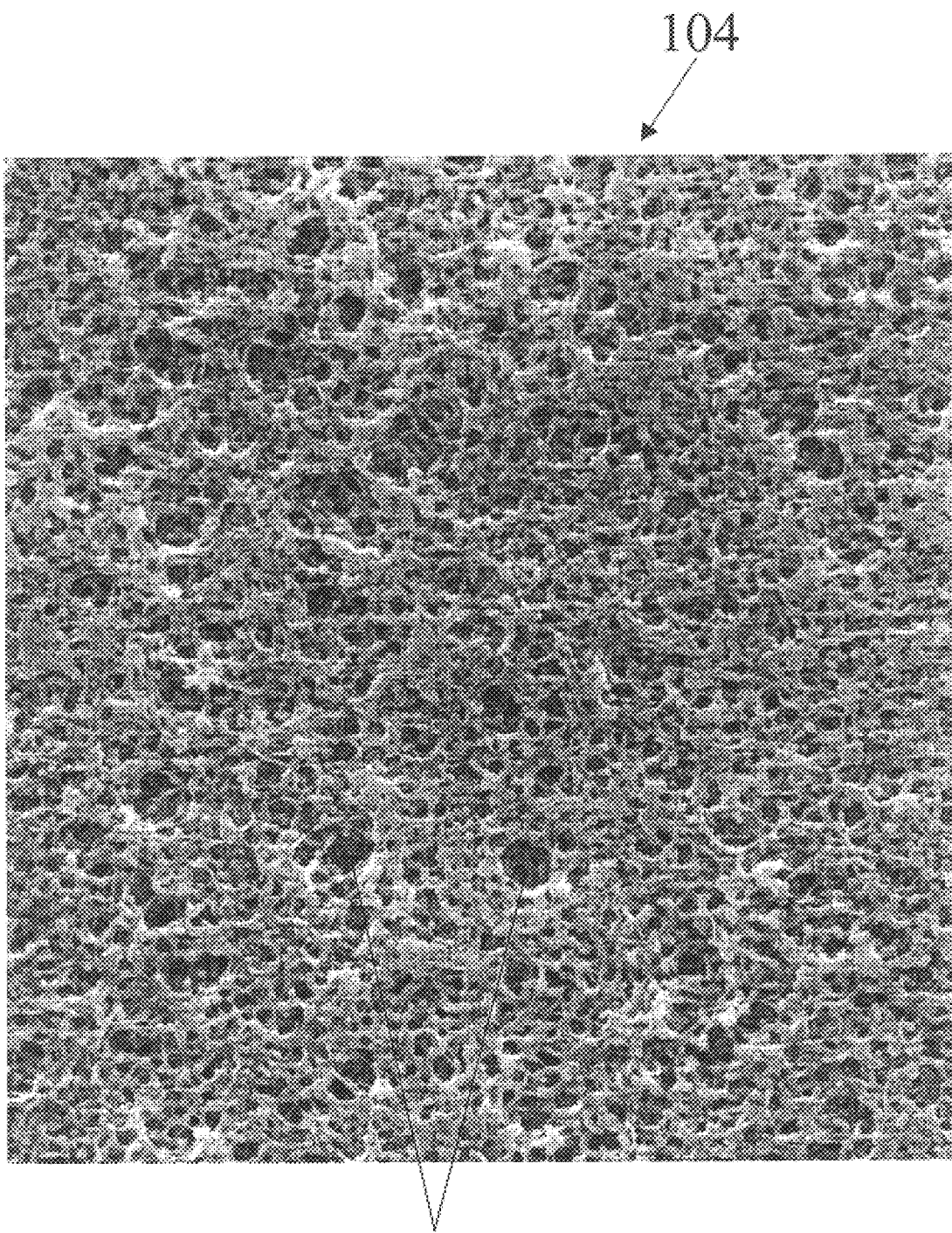
FIG. 2 is a scanning electron micrograph of a surface region of a microporous gel-forming layer on a UHMWPE web.
Figure 3:
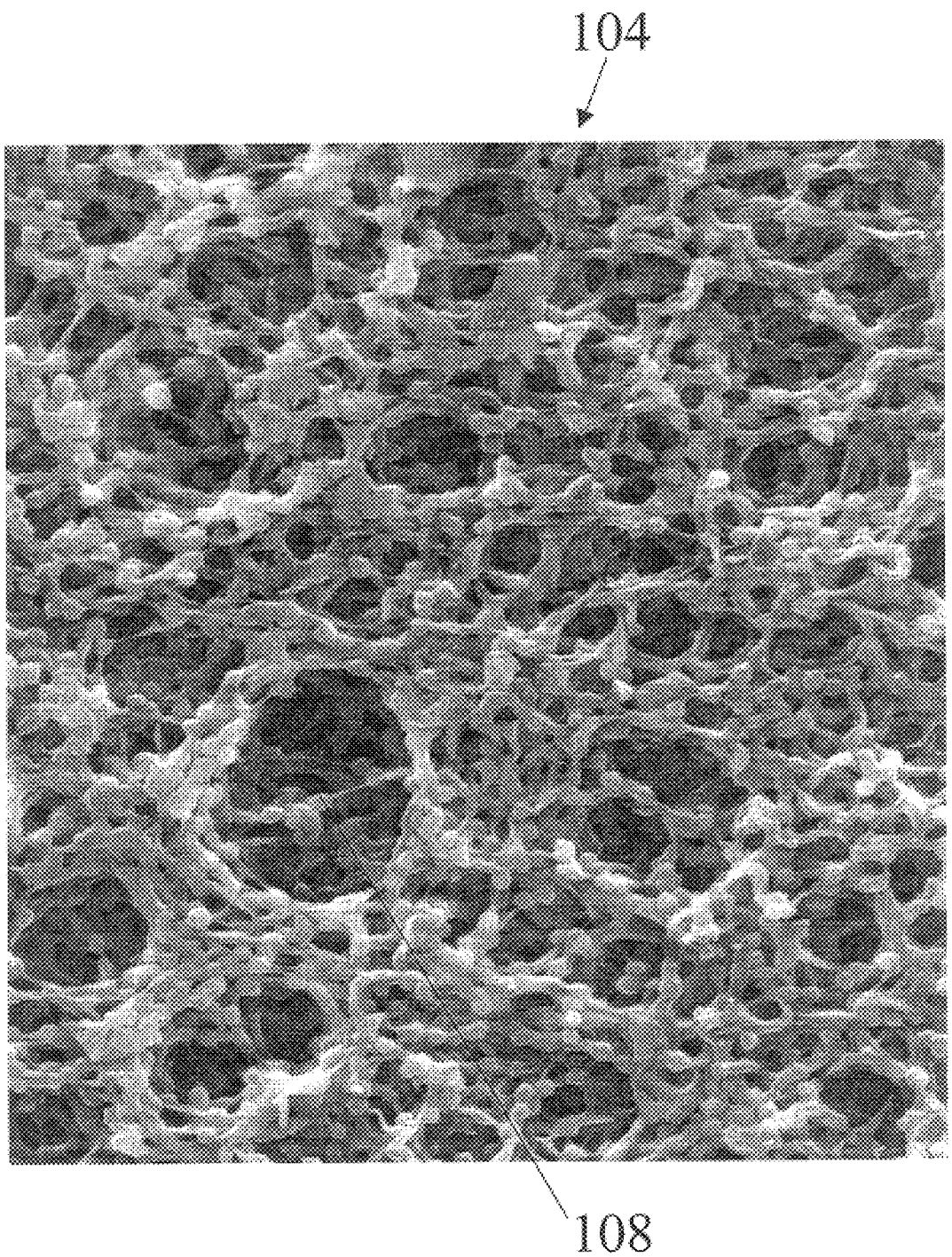
FIG. 3 is an enlarged scanning electron micrograph depicting a portion of the same surface region of the microporous gel-forming layer shown in FIG. 2.

FIGS. 2 and 3 are scanning electron micrographs that show the porosity of a surface of microporous PVDF layer 104 at low and high magnification, respectively. The lower magnification scanning electron micrograph of FIG. 2 has a scale of 2.42 inches equal to 20 micrometers while the higher magnification scanning electron micrograph of FIG. 3 has a scale of 1.5 inches equal to 5 micrometers. Passageways 108 contained within microporous PVDF layer 104 allow impregnation of the PVDF layer by liquid electrolyte. The liquid electrolyte is introduced into the battery and wicks through the edges of both the microporous PVDF layer 104 and the UHMWPE web 102 along with first and second major surfaces 106a and 106b via capillary action. The electrolyte then progresses to uniformly infiltrate the entire separator via capillary action, thus beneficially reducing the time required to achieve uniform distribution of the liquid electrolyte within the separator as compared to the distribution time resulting from diffusion through a nonporous PVDF layer.

It is standard in the battery separator industry to determine the magnitude of separator porosity using a Gurley Automatic Densometer, e.g., Model #4340 manufactured by Gurley Precision Instruments in Troy, N.Y., or an analogous instrument. Densometers force air from one separator surface to the other surface and measure the time required to pass a certain volume of air. The Gurley Automatic Densometer #4340 offers three selectable modes of operation, and the data presented below were acquired with the instrument operating in a high pressure mode using 10 cc of air and a one square inch orifice. Thus, for purposes of the present invention, the Gurley value is a measure of seconds per volume of air, i.e., s/10 cc air. The microporous gel-forming polymer layer envisioned for use in the present invention preferably has a Gurley value of less than 1,000 s/10 cc air.

The porosity of microporous PVDF layer 104 is achieved by creating passageways 108 through which liquid electrolyte may wick. The first step in creating passageways 108 entails choosing a gel-forming polymer. While a PVDF homopolymer is a preferred gel-forming polymer, the chosen polymer can be any gel-forming polymer that is compatible with the components in a lithium-ion battery and functions to immobilize or partly immobilize the electrolyte and bond the electrodes to the battery separator. Exemplary gel-forming polymers include polyvinylidene fluoride (PVDF), polyethylene oxide, polyacrylonitrile, polymethyl methacrylate, vinylidene fluoride-hexafluoropropylene copolymers, ethylene-acrylic acid copolymers, ethylene-styrene copolymers, styrene-butadiene copolymers, styrene-isoprene copolymers, and combinations thereof.

The chosen gel-forming polymer is dissolved in a solvent that allows the formation of a homogenous solution. Any solvent or mixture of solvents that dissolve the chosen gel-forming polymer may be used. However, the solvent selected has a relatively low boiling point and a relatively low surface tension. Exemplary suitable solvents include ketones (e.g., acetone or methylethyl ketone), chlorinated solvents (e.g., methylene chloride), hydrocarbon solvents (e.g., pentane, hexane, or toluene), acetates (e.g., ethyl acetate), or carbonates (e.g. propylene carbonate). Heating the solution expedites dissolution.

The resulting gel-forming polymer solution is then coated on at least one major surface of the UHMWPE web. The web can be treated using a corona treatment, plasma treatment, or radiation cross-linking treatment before or after the coating is applied. These treatments improve adherence of the coating to the polymer web or otherwise modify the polymer structure. Coating is achieved by applying the coating solution using any coating technique known in the art, including, but not limited to, dip coating, spray coating, roll coating, or printing (to form a discontinuous or patterned coating). The coating technique selected may cause the coating to remain primarily on the surfaces of the web or may cause the coating to partly impregnate the web.

After the coating has been applied and the coating solution has cooled on the web, the solvent is allowed to evaporate, thereby forming and preserving passageways 108 within the microstructure of the coating and resulting in a microporous PVDF layer.

The UHMWPE web preferably has sufficient porosity to allow the liquid electrolyte to rapidly wick through it. The preferred UHMWPE incorporated into the web is one having an intrinsic viscosity of at least 10 deciliters/gram and preferably greater than about 20 deciliters/gram. Current commercially available UHMWPEs have an upper limit of intrinsic viscosity of about 29 deciliters/gram. While any process known in the art may be used to create the UHMWPE web, the preferred process is the "wet" method in which UHMWPE and any other desired ingredients are combined in a liquid, non-volatile plasticizer to form a slurry. The resulting slurry is injected into the feed port of a twin-screw extruder and subjected to elevated temperatures and shear. The slurry is then extruded through a die, and sufficient plasticizer is extracted from the resulting film in order for the plasticizer to form a microporous web composed essentially of UHMWPE. The preferred percentage of UHMWPE contained within the polymer web is greater than about 75% by weight.

The plasticizer is preferably a nonevaporative solvent for the UHMWPE that is liquid at room temperature since the plasticizer has little or no solvating effect on the polymer at room temperature; rather, it performs its solvating action at temperatures at or above the softening temperature of the UHMWPE. The solvating temperature of UHMWPE is about 160° C., preferably in the range of between about 160° C. and about 220° C. Exemplary plasticizers include paraffinic oil, naphthenic oil, aromatic oil, or a mixture of two or more such oils. Examples of suitable commercial processing oils include oils sold by Shell Oil Company (such as ShellFlex™ 3681, Gravex™ 41, and Catnex™ 945), oils sold by Chevron Oil Company (such as Chevron 500R), and oils sold by Lyondell Oil Company (such as Tufflo™ 6056).

Exemplary minor ingredients incorporated into the UHMWPE web include antioxidants, colorants, pigments, residual plasticizer or processing oil, waxes, lubricants, other polymers, and processing aids.

The following examples describe the construction of the separators in accordance with the present invention and some of their chemical and physical properties.

EXAMPLE 1

A PVDF solution (5.25% w/v) was formed by dissolving Kynar™ 741 (105 grams; Elf AtoChem; Philadelphia, Pa.) in acetone (2,000 ml) in a large glass flask. The mixture was heated to 55° C. while stirring, and a clear solution was formed. Next, the heated PVDF solution was poured into a stainless steel dip tank attached to a coating machine. The dip tank was equipped with a roller near its bottom and with entry/exit slots in the lid for separator transport through the coating solution. The dip tank was also equipped with a heater and a controller that jointly maintained a PVDF solution temperature of 47±2° C.

A microporous UHMWPE web (Teklon®; Entek Membranes LLC, Lebanon, Oreg.) having a thickness of 18±0.5 micrometers was passed through the hot PVDF solution. The coated web appeared translucent as it exited the dip tank but then turned opaque as the acetone evaporated as compressed air impinged upon the web surface.

Table 1 shows the final thickness, PVDF coat weight, and Gurley value for the PVDF-coated separator described above as a function of line speed.

TABLE I

A Tabular Summary of Various Physical Properties of the PVDF-Coated Separator of the Present Invention as a Function of Line Speed.

| Line Speed (cm/min) | 198 | 213 | 305 | 457 | 518 |
|---|---|---|---|---|---|
| Thickness (micrometers) | 24.2 | 24.5 | 30.1 | 40.2 | 41.5 |
| PVDF Coat Wt. (mg/cm$^2$) | 0.60 | 0.71 | 0.83 | 1.17 | 1.22 |

TABLE I-continued

A Tabular Summary of Various Physical Properties of the PVDF-Coated Separator of the Present Invention as a Function of Line Speed.

| Gurley Value (s/10 cc air) | 62.8 | 59.3 | 70.9 | 60.5 | 61.6 |
|---|---|---|---|---|---|

EXAMPLE 2

The process described in Example 1 was repeated using PVDF solutions with concentrations of 4.0, 5.0, 5.25, and 5.5% w/v PVDF. A 21-micrometer thick Teklon® UHM-WPE microporous web was coated at a line speed of 198 cm/min with each PVDF solution. The following table summarizes the final thickness, PVDF coat weight, and Gurley value for the PVDF-coated separators as a function of PVDF solution concentration.

TABLE II

A Tabular Summary of Various Physical Properties of the PVDF-Coated Separator of the Present Invention as a Function of PVDF Solution Concentration.

| PVDF Solution Concentration (% w/v) | 4.0 | 5.0 | 5.25 | 5.5 |
|---|---|---|---|---|
| Thickness (micrometers) | 21.3 | 24.9 | 26.1 | 27.9 |
| PVDF Coat wt. (mg/cm$^2$) | 0.31 | 0.53 | 0.66 | 0.70 |
| Gurley Value (s/10 cc air) | 57.9 | 60.0 | 58.9 | 85.2 |

Figure 4A:
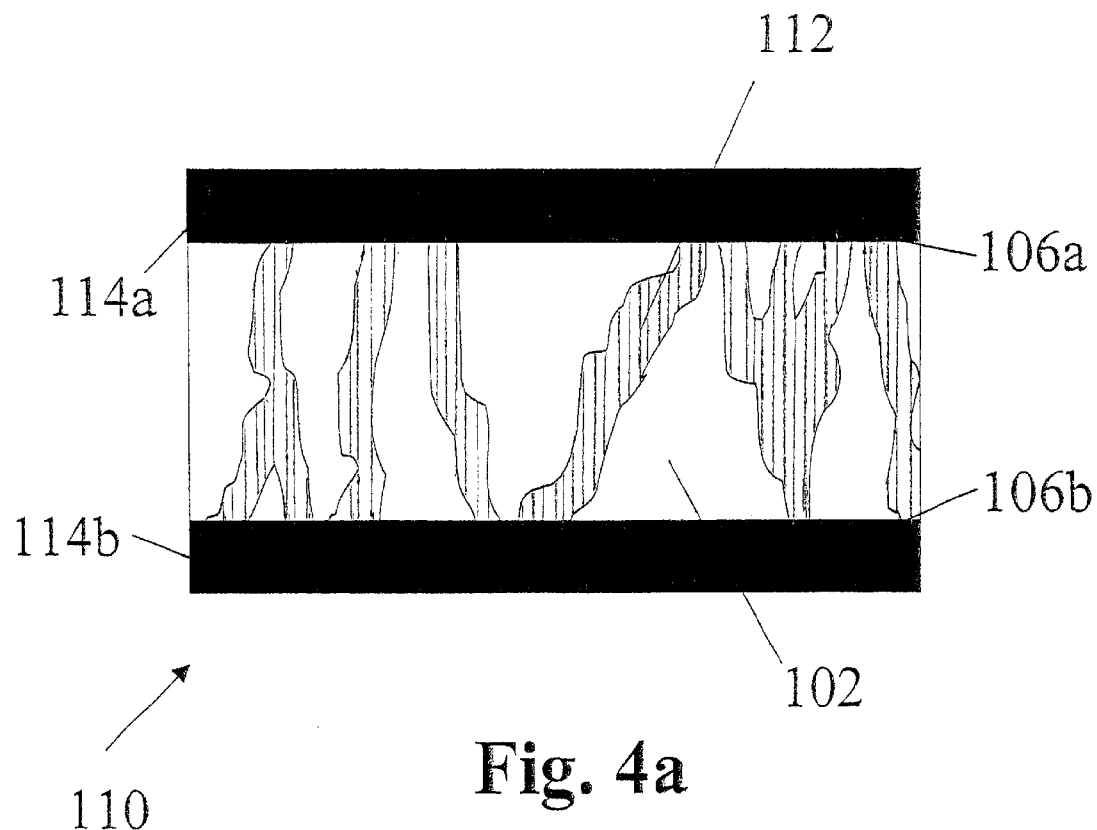
FIGS. 4a and 4b are cross-sectional schematic diagrams depicting hybrid electrolyte systems in which a UHMWPE web containing liquid electrolyte is positioned adjacent to, respectively, two gel electrolyte layers and two hybrid electrolyte layers in which both gel and liquid electrolyte co-exist.
Figure 4B:
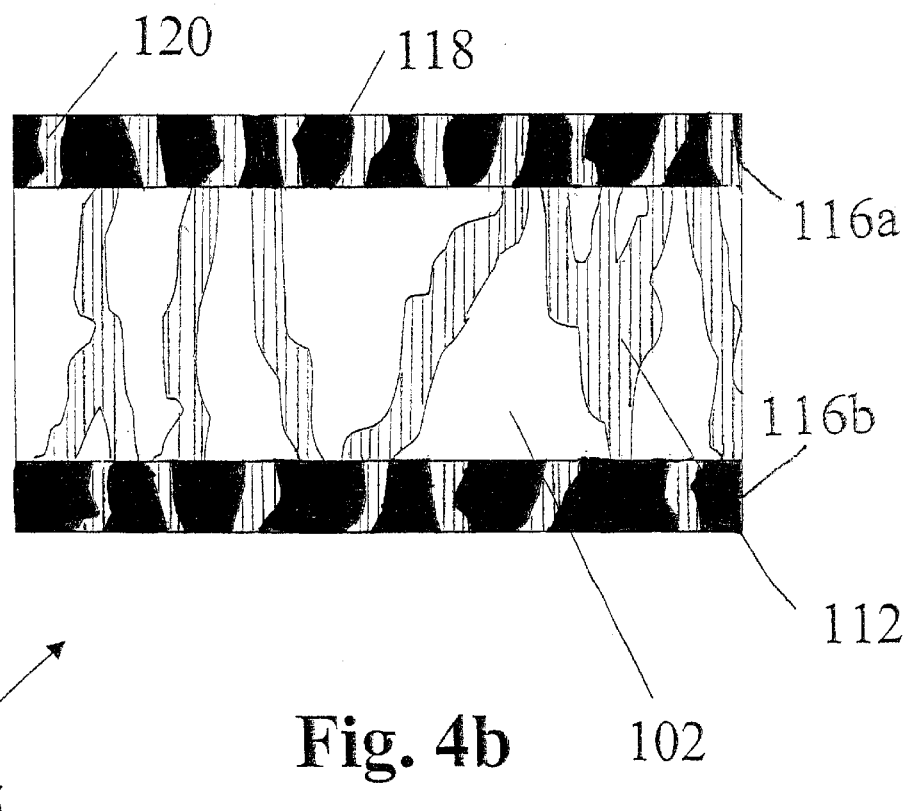

The porosity of the microporous PVDF layer and the microporous nature of the UHMWPE web facilitate the formation of a hybrid electrolyte system. FIGS. 4a and 4b are cross-sectional schematic diagrams of two hybrid electrolyte systems. FIG. 4a depicts a hybrid electrolyte system 110 in which a UHMWPE web 102 contains web pores 112 and is positioned adjacent to a first homogenous gel electrolyte layer 114a and a second homogeneous gel electrolyte layer 114b. First major surface 106a of UHMWPE web 102 is adjacent to first homogeneous gel electrolyte layer 114a and second major surface 106b of UHMWPE web 102 is adjacent to second homogeneous gel electrolyte layer 114b. The majority of web pores 112 are filled with liquid electrolyte, while first and second homogeneous gel electrolyte layers 114a and 114b contain gel electrolyte. Gel electrolyte layers 114a and 114b provide sufficient bonding strength to bond the electrodes together such that containment of the battery in a metal can is not necessary, and the liquid electrolyte in web pores 112 of UHMWPE web 102 provides excellent ionic conductivity.

FIG. 4b depicts a hybrid electrolyte system 115 in which a UHMWPE web 102 with web pores 112 is positioned adjacent to a first layer 116a containing both liquid 120 and gel 118 electrolyte regions and a second layer 116b containing both liquid 120 and gel 118 electrolyte regions. Thus, in contrast to the hybrid electrolyte system 110 of FIG. 4a, the hybrid electrolyte system 115 of FIG. 4b has at least one layer in which both liquid and gel electrolyte regions co-exist.

The porosity of PVDF layer 104 and the microporous nature of UHMWPE web 102 also facilitate the formation of a thin and flexible microporous separator. While the separators of the present invention are not limited to a specific thickness, the separators preferably have a thickness range of 10–50 micrometers, which falls within the preferences of lithium-ion polymer battery manufacturers.

Figure 5A:
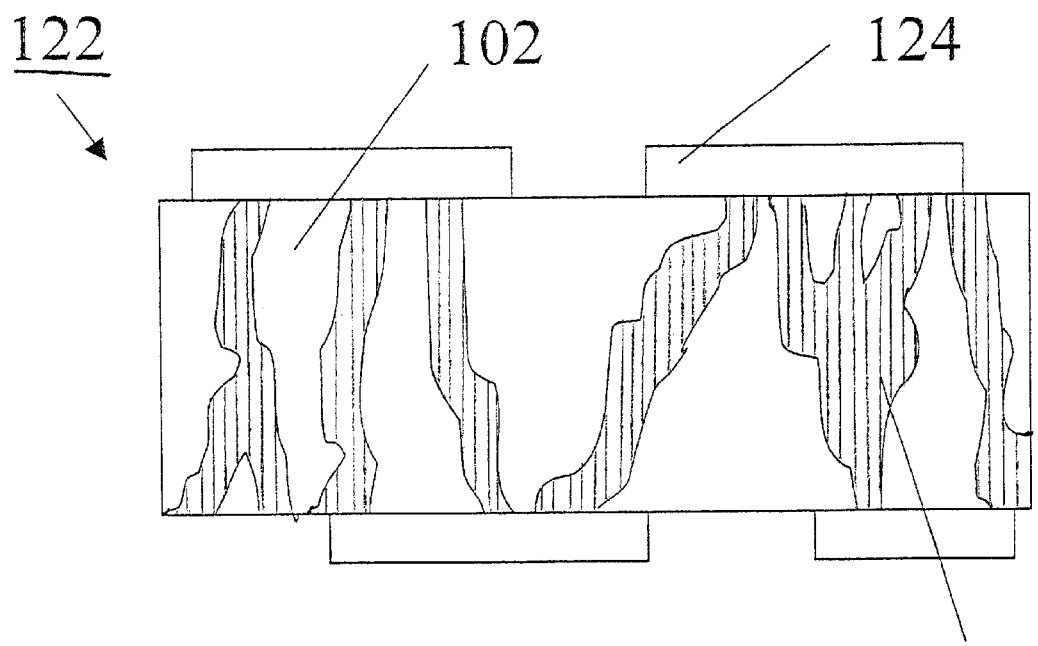
FIGS. 5a and 5b are respective cross-sectional and plan views of an alternative implementation of the first embodiment in which a nonporous gel-forming polymer material is applied as a patterned coating on a UHMWPE web surface.
Figure 5B:
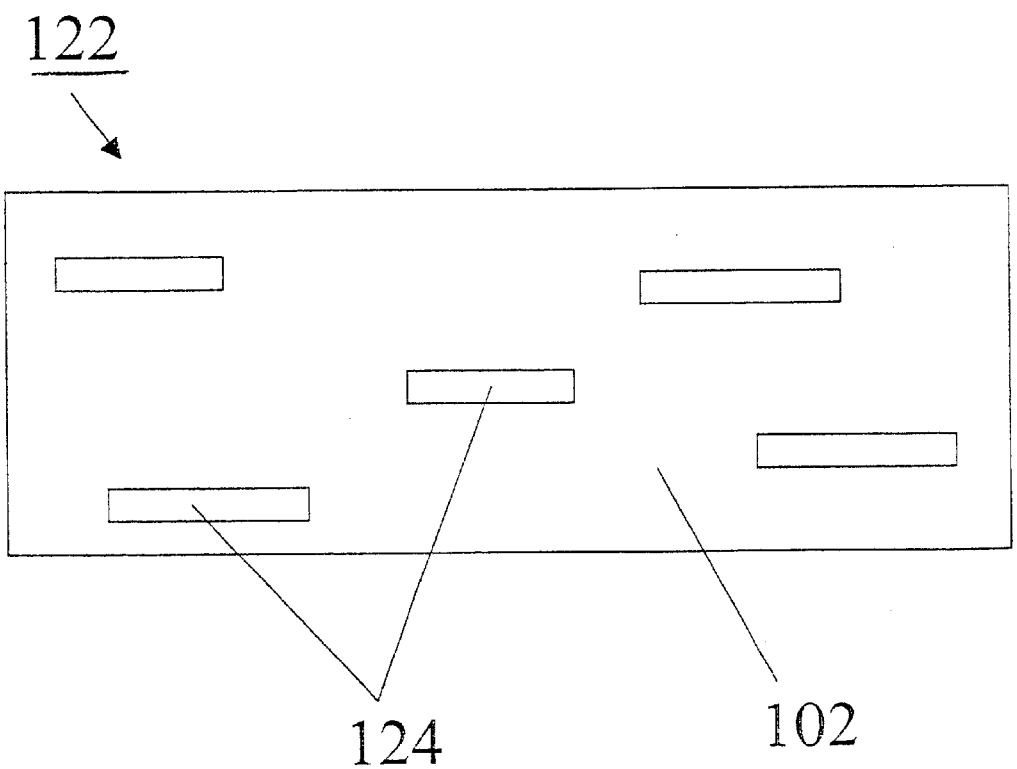

In an alternative implementation of the first embodiment, a gel-forming polymer material that forms a nonporous coating is applied to UHMWPE web 102 in a pattern, leaving surface pores accessible to the electrolyte. This alternative implementation is depicted in FIGS. 5a and 5b, which are, respectively, cross-sectional and plan views of a battery separator 122 according to the alternative implementation. As shown in FIGS. 5a and 5b, microporous UHMWPE web 102 contains web pores 112, which are filled with electrolyte. A nonporous coating 124 is placed on UHMWPE web 102 in a pattern to achieve a separator with overall porosity.

The following example describes the construction of the separator in accordance with the alternative implementation of the present invention.

EXAMPLE 3

A poly(ethylene-acrylic acid) (EAA) copolymer emulsion (20 g; Adcote™ 50T4990; Morton Adhesives) was mixed with deionized water (10 g) and isopropanol (10 g) in a beaker to form a homogeneous coating solution. The coating solution was poured into a glass jar and attached to an air brush (Badger Model #350) with the inlet air pressure set at 20 psi.

A plastic grid with square holes spaced approximately 2 mm apart was placed on the top surface of an 18-micrometer thick UHMWPE web (Teklon®; Entek Membranes LLC, Lebanon, Oreg.). The coating solution was sprayed onto the web through the plastic grid from a distance of approximately 17 cm at a coverage speed of 30 cm/sec with the spray nozzle at the maximum setting. The coated web was then placed in a circulating oven for approximately 20 sec at 110° C. to evaporate the solvent mixture. Three iterations of coating and drying were performed, and then the web was inverted and the coating solution was applied to the bottom surface and dried as described above.

The resultant web had approximately 1 mm×1 mm regions of EAA distributed over its surfaces to give a coat weight of 0.44 mg/cm$^2$. The Gurley value for the coated web was 60.4 seconds as compared to 31.4 seconds for the uncoated control.

Figure 6:
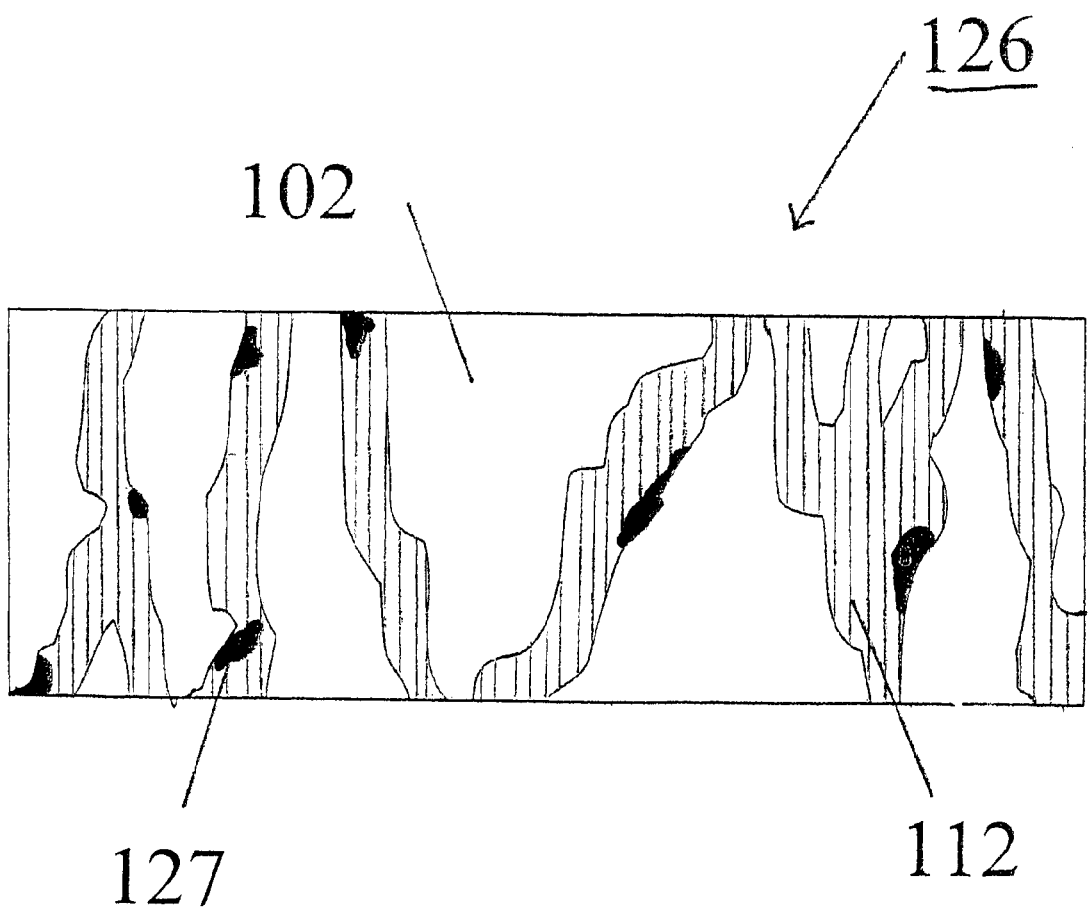
FIG. 6 is a schematic diagram depicting a second preferred embodiment of the present invention in which the bulk region of a microporous separator contains islands of gel-forming polymer.

In a second preferred embodiment of the present invention, the gel-forming polymer material is incorporated into a UHMWPE polymer web during the extrusion process, thereby providing regions of gel-forming polymer throughout the bulk region of the separator. This second embodiment is depicted in FIG. 6, which is a schematic diagram depicting gel electrolyte regions 127 as well as web pores 112 distributed throughout the bulk region of the microporous separator 126. Web pores 112 are filled with liquid electrolyte Thus, both gel and liquid electrolyte regions co-exist throughout microporous separator 126. This second embodiment confers all of the benefits described for the first preferred embodiment including the formation of a thin, flexible, microporous separator with a reduced uniform distribution time and excellent ionic conductivity. The second preferred embodiment also results in increased separator processing efficiency and cost-effective manufacture because it is fabricated by a single-step process.

The separator of the second preferred embodiment is made by combining UHMWPE, a gel-forming polymer, and any other desired ingredients in a liquid, non-volatile plasticizer to form a slurry. The resulting slurry is then injected into the feed port of a twin-screw extruder and subjected to elevated temperatures and shear. The slurry is extruded through a die, and sufficient plasticizer is extracted from the resulting film to form a microporous bulk region composed essentially of UHMWPE and the gel-forming polymer.

The preferred UHMWPE to be incorporated into the extruded film is one having an intrinsic viscosity of at least 10 deciliters/gram and preferably greater than 20 deciliters/gram. Current commercially available UHMWPEs have an upper limit of intrinsic viscosity of about 29 deciliters/gram.

The plasticizer incorporated into the extruded film is preferably a nonevaporative solvent for the UHMWPE and is preferably in a liquid state at room temperature. The plasticizer has little or no solvating effect on the polymer at room temperature; rather, it performs its solvating action at temperatures at or above the softening temperature of the polymer. For UHMWPE, the solvating temperature would be above 160° C., preferably in the range of between about 160° C. and about 220° C. Exemplary plasticizers include paraffinic oil, naphthenic oil, aromatic oil, or a mixture of two or more such oils. Examples of suitable processing oils include oils sold by Shell Oil Company (such as ShellFlex™ 3681, Gravex™ 41, and Catnex™ 945), oils sold by Chevron Oil Company (such as Chevron 500R), and oils sold by Lyondell Oil Company (such as Tufflo™ 6056).

The gel-forming polymer incorporated in the extruded film is preferably a PVDF homopolymer or copolymer. However it can be any gel-forming polymer that is compatible with the components in a lithium-ion battery and that functions to immobilize or partly immobilize the electrolyte and to mechanically bond the electrodes to the separator. Exemplary gel-forming polymers include polyvinylidene fluoride (PVDF), polyethylene oxide, polyacrylonitrile, polymethyl methacrylate, vinylidene fluoride-hexafluoropropylene copolymers, ethylene-acrylic acid copolymers, ethylene-styrene copolymers, styrene-butadiene copolymers, styrene-isoprene copolymers, and combinations thereof. In the instance where the gel-forming polymer is added to the UHMWPE before extrusion, the gel-forming polymer may be either soluble or insoluble in the plasticizer used in the extrusion process. However, the gel-forming polymer must not be extensively soluble in the solvent used to extract the plasticizer from the extruded film to convert it into the final porous separator. As a result of this process, regions of gel-forming polymer are distributed throughout the bulk region.

Exemplary minor ingredients incorporated into the resultant separator include antioxidants, colorants, pigments, residual plasticizer or processing oil, waxes, lubricants, other polymers, and processing aids.

The practice of the invention is not limited to a specific separator composition or to a specific separator thickness, as the separator thickness and composition may vary widely. However, some examples of microporous separators of the present invention are presented below.

EXAMPLE 4

UHMWPE (9.0 g, 1900 HCM; Montell Polyolefins) was added to polyvinylidene fluoride (1.8 g, Kynar™ 741; Elf-Atochem) in a 250 ml plastic beaker, and the combination was blended to form a homogeneous mix. The resulting powder mixture was added to Tufflo™ oil (41.0 g; Lyondell) in a HAAKE Rheomix 600 miniature intensive mixer fitted with roller blades and driven by a HAAKE Rheocord 90 torque Rheometer, turning at 80 rpm and set at 180° C. The mixture was then compounded for five minutes, resulting in a homogeneous, cohesive mass. This mass was transferred to a C.W. Brabender Prep-Mill Model PM-300, two-roll mill, turning at 15 rpm and set at 160° C. The roll gap was adjusted to approximately 0.7 mm, and the resulting polymer sheet was removed from the rolls with a take-off knife.

The polymer sheet was allowed to cool to room temperature, and a razor blade was used to cut an individual 50 mm×50 mm coupon from the sheet. The coupon was then placed between two sheets of aluminum foil and pressed for 15 seconds in a Carver Press at a temperature of 150° C. and a gauge pressure of 8 metric tons. A 40 mm×60 mm sample was cut from the pressed oil-filled sheet and was sandwiched between layers of a nylon non-woven sheet and a porous polyolefin grid. The oil-filled sample was held in place at the edges of the polyolefin grid with binder clips. The assembly was placed in a 1500 ml tricholoethylene bath in which a magnetic stir bar was used to circulate the solvent, thereby promoting extraction of the Tufflo™ oil. The assembly was removed from the trichloroethylene bath after 15 minutes, and the trichloethylene-laden sheet was dried in a fume hood for five minutes at 20° C. while restrained in the holder assembly.

The resultant microporous separator had a thickness of 0.04 mm, a density of 0.50 g/cm$^3$, and a porosity of 50.5%, which was calculated from the skeletal densities of the respective polymer phases. A Gurley value of 18.0 seconds was obtained for the separator.

EXAMPLE 5

UHMWPE (9.0 g, 1900 HCM; Montell Polyolefins) was added to polyvinylidene fluoride (1.8 g, Kynar™ 2801; Elf-Atochem) in a 250 ml plastic beaker, and the combination was blended to form a homogeneous mix. The powder mixture was then added to Tufflo™ oil (41.0 g; Lyondell) and processed as described in Example 4, except that the two-roll mill temperature was 170° C.

The resultant microporous separator had a thickness of 0.046 mm, a density of 0.44 g/cm$^3$, and a porosity of 56.5%, which was calculated from the skeletal densities of the respective polymer phases. A Gurley value of 11.9 seconds was obtained for the separator.

EXAMPLE 6

UHMWPE (9.0 g, 1900 HCM; Montell Polyolefins) was added to polyethylene oxide (1.8 g, PolyOx™; WSR Coagulant; Union Carbide) in a 250 ml plastic beaker, and the combination was blended to form a homogeneous mix. The powder mixture was then added to Tufflo™ oil (41.0 g; Lyondell) and processed as described in Example 4.

The resultant microporous separator had a thickness of 0.05 mm, a density of 0.36 g/cm$^3$, and a porosity of 62.8%, which was calculated from the skeletal densities of the respective polymer phases. A Gurley value of 14.8 seconds was obtained for the separator.

EXAMPLE 7

UHMWPE (9.0 g, 1900 HCM; Montell Polyolefins) was added to polyacrylonitrile (1.8 g; Aldrich Chemical Co.) in a 250 ml plastic beaker, and the combination was blended to form a homogeneous mix. The powder mixture was then added to Tufflo™ oil (41.0 g; Lyondell) and processed as described in Example 4.

The resultant microporous separator had a thickness of 0.124 mm, a density of 0.27 g/cm$^3$, and a porosity of 72.0%, which was calculated from the skeletal densities of the respective polymer phases. A Gurley value of 64.1 seconds was obtained for the separator.

Figure 7:
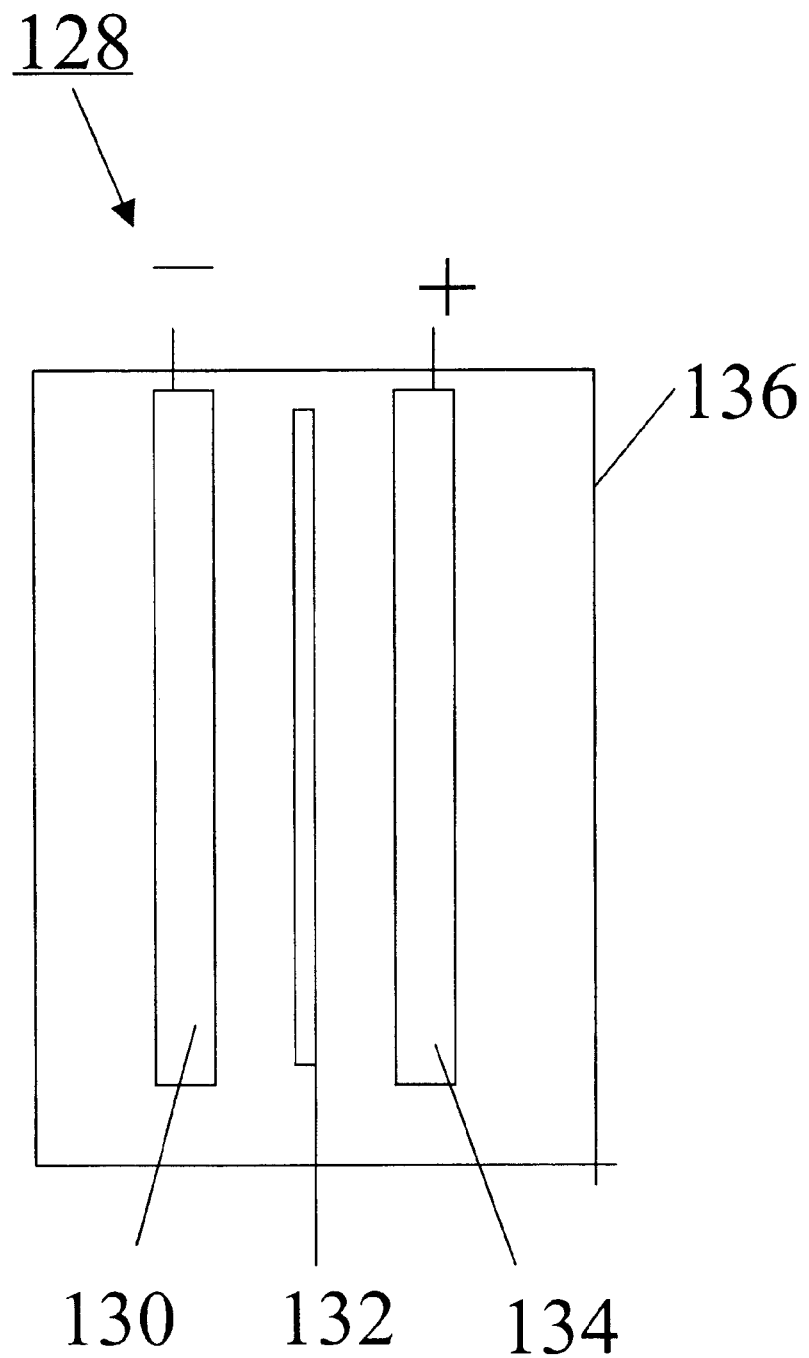
FIG. 7 is a schematic diagram of a lithium-ion battery.

A first preferred implementation of the first and second preferred embodiments is the use of the freestanding microporous separator in a lithium-ion battery, as depicted in FIG. 7. A lithium-ion battery converts chemical energy to electrical energy. The lithium-ion battery 128 depicted in FIG. 7 is composed of a negative electrode (anode) 130, an electrolyte (not shown), a separator 132, a positive electrode (cathode) 134, and current collectors. Battery 128 has a pouch 136 that surrounds anode 130, the electrolyte, separator 132, cathode 134, and the current collectors. A wide variety of electrochemically active materials can be used to form anode 130 and cathode 134, as is commonly known in the art. Exemplary cathodes include lithium nickel oxide, lithium cobalt oxide, and lithium manganese oxide as well as any type of hybrid lithium oxide, e.g., lithium nickel cobalt oxide. The anode may be any suitable anode known in the art, but is preferably carbon-based. Exemplary carbon-based anodes include crystalline or amorphous carbaceous materials in the form of fiber, powder, or microbeads including natural or synthetic graphite, carbon black, coke, mesocarbon microbeads, or activated carbon.

Preparation of lithium-ion battery 128 entails positioning the separator of the first or second preferred embodiments of the present invention adjacent to anode 130 and to cathode 134 and adding an ionically conductive electrolyte. Multiple separators can be wound or stacked in a package and then filled with an electrolyte. The separator may be laminated or bonded to the electrodes and this process may occur before or after introduction of the electrolyte.

It will be obvious to those having skill in the art that many changes may be made to the details of the above-described embodiments of this invention without departing from the underlying principles thereof. The scope of the present invention should, therefore, be determined only by the following claims.

What is claimed is:

1. A battery separator, comprising:
    a polymer material composition in the form of a freestanding unitary structure with first and second major surfaces, the composition comprising a microporous polymer web and a gel-forming polymer material with passageways that provide overall first major surface-to-second major surface fluid permeability for the unitary structure.

2. The battery separator of claim 1, in which the microporous polymer web has a web major surface and the gel-forming polymer material is in the form of a layer coating the web major surface.

3. The battery separator of claim 2, in which the layer of gel-forming polymer material is nonporous and coats separate regions of the web major surface.

4. The battery separator of claim 2, in which the layer of gel-forming polymer material is microporous.

5. The battery separator of claim 2, in which the layer of gel-forming polymer material is microporous and coats separate regions of the web major surface.

6. The battery separator of claim 2, in which the microporous polymer web and layer of gel-forming polymer material have a total thickness that ranges from between about 10 microns to about 50 microns.

7. The battery separator of claim 6, in which the layer of gel-forming material completely covers the web major surface.

8. The battery separator of claim 6, in which the microporous layer of gel-forming material includes solvent evaporation-induced passageways.

9. The battery separator of claim 1, in which the gel-forming polymer material is selected from a group consisting essentially of polyvinylidene fluoride (PVDF), polyethylene oxide, polyacrylonitrile, polymethyl methacrylate, vinylidene fluoride-hexafluoropropylene copolymers, ethylene-acrylic acid copolymers, ethylene-styrene copolymers, styrene-butadiene copolymers, styrene-isoprene copolymers, and combinations thereof.

10. The battery separator of claim 1, in which the microporous polymer web has a bulk region and the gel-forming polymer material resides in the bulk region.

11. The battery separator of claim 1, in which the microporous web includes an ultrahigh molecular weight polyolefin.

12. The battery separator of claim 11, in which the ultrahigh molecular weight polyolefin is ultrahigh molecular weight polyethylene.

13. The battery separator of claim 11, in which the microporous web includes at least 75% ultrahigh molecular weight polyolefin.

14. The battery separator of claim 11, in which the microporous web includes at least 90% ultrahigh molecular weight polyolefin.

15. The battery separator of claim 1, in which the microporous polymer web has a web thickness that ranges from between about 8 microns to about 35 microns.

16. The battery separator of claim 1, in which the first and second major surfaces of the freestanding unitary structure are positioned adjacent respective first and second electrode structure surfaces carrying electrochemically active powders to form a battery power source using an electrolyte as an ion transport medium, the electrochemically active powder of the first electrode structure surface including a metal oxide component to form a positive electrode structure and the second electrode structure surface including a carbon-based component to form a negative electrode structure.

17. The battery separator of claim 16, in which the metal oxide component is selected from a group consisting essentially of lithium cobalt oxide (LiCoO), lithium nickel oxide (LiNiO$_2$), lithium manganese oxide (LiMn$_2$O$_4$), and lithium nickel cobalt oxide (LiNi$_x$Co$_{1-x}$O$_2$).

18. The battery separator of claim 16, in which the carbon-based component is selected from a group consisting essentially of crystalline or amorphous carbonaceous materials in the form of fiber, powder, or microbeads including natural or synthetic graphite, carbon black, coke, mesocarbon microbeads, or activated carbon.

* * * * *